UNITED STATES PATENT OFFICE.

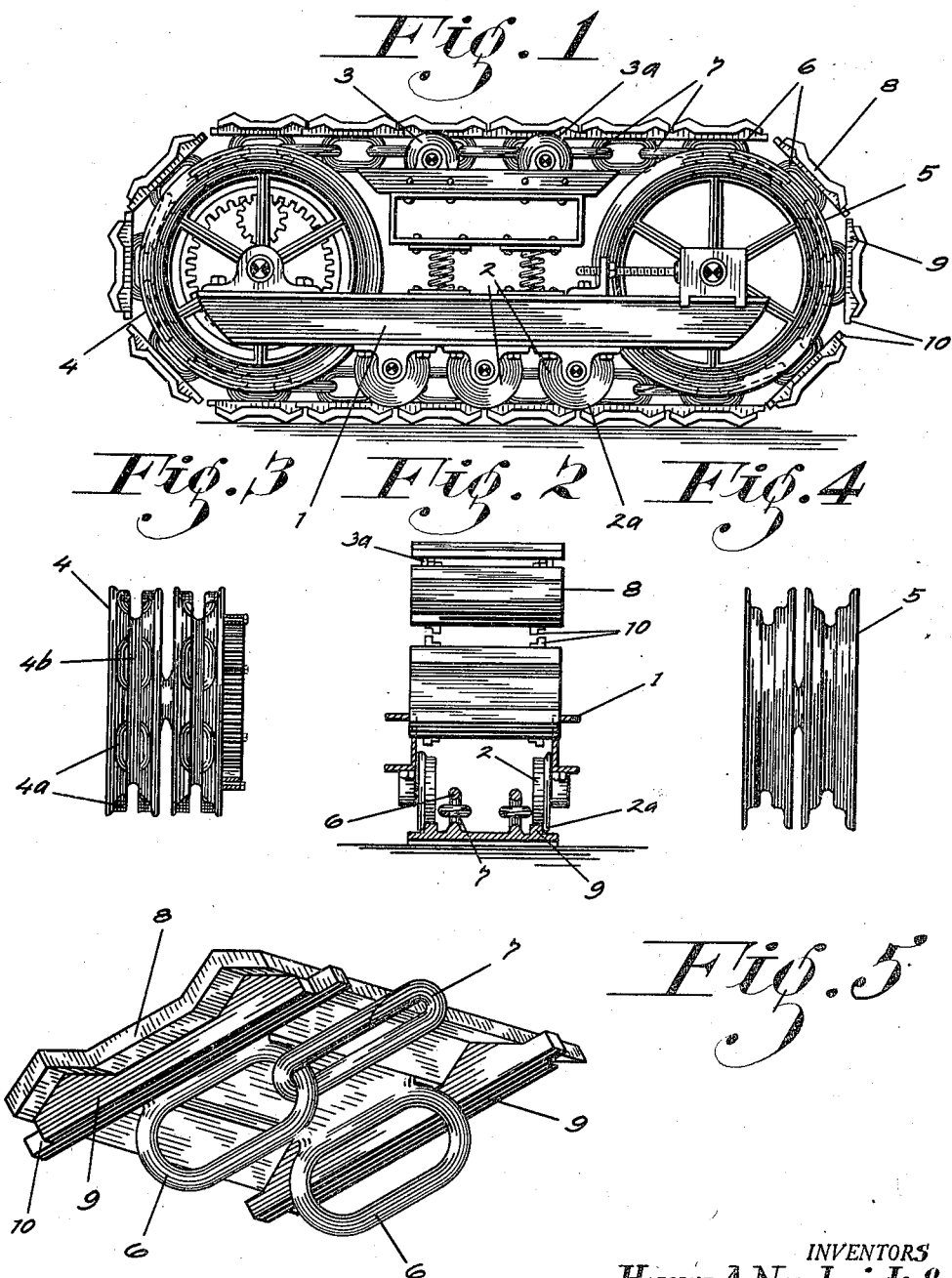

HENRY A. NORDWICK AND WILLIAM A. BARTH, OF STOCKTON, CALIFORNIA.

ENDLESS TRACK FOR TRACTORS.

1,300,455.     Specification of Letters Patent.     Patented Apr. 15, 1919.

Application filed December 10, 1917. Serial No. 206,426.

*To all whom it may concern:*

Be it known that we, HENRY A. NORDWICK and WILLIAM A. BARTH, both citizens of the United States, residing at Stockton, in the county of San Joaquin, State of California, have invented certain new and useful Improvements in Endless Tracks for Tractors; and we do declare the following to be a clear, full, and exact description of the same, reference being had to the accompanying drawings, and to the characters of reference marked thereon, which form a part of this application.

This invention relates to improvements in tractors of the endless track type. The object of the invention is to produce an endless track for the wheel constructed of chain links arranged alternately in vertical and horizontal position, those extending vertically having track shoes fixed rigidly thereon, and the horizontal links being flexibly connected with the said vertical links, whereby the track may be driven by a chain sprocket or pulley of the usual type. The track shoes are provided with inwardly projecting flanges which overlap at their ends to form a continuous supporting track for the rollers of the truck supported by the track. By means of this construction, we provide a flexible track which does not have any roller or sleeve bearings of the type now commonly used which quickly cut and wear out and which are much more complicated and expensive of construction than our improved chain drive mechanism.

A further object of the invention is to produce a simple and inexpensive device and yet one which will be exceedingly effective for the purposes for which it is designed.

These objects, we accomplish by means of such structure and relative arrangement of the parts as will fully appear by a perusal of the following specification and claim which form a part of this application.

On the drawings, similar characters of reference indicate the corresponding parts in the several views.

Figure 1 is a side elevation of one of the track wheels complete.

Fig. 2 is an end view of the same, partly broken out and in section.

Fig. 3 is a front elevation of the chain sprocket used to drive the track.

Fig. 4 is a similar view of the idling pulleys used in connection with the track.

Fig. 5 is a perspective view of the under side of one of the track shoes showing the chain links fixed thereon and one of the flexible links connected therewith.

Referring now more particularly to the characters of reference on the drawings, the numeral 1 designates the supporting truck of the track wheel on which are the bottom rollers 2 and top rollers 3. In constructing our improved wheel, we first provide at the driving end of the wheel two or more chain sprockets or pulleys 4 and at the opposite end corresponding idler sprockets or pulleys 5. The members 4 may be driven by an integral worm gear or by any other suitable driving mechanism found desirable.

Our improved track comprises driving chains, one for each of the driving pulleys. Each chain consists of vertical links 6 and horizontal links 7 flexibly connected therewith. Fixed rigidly on each set of vertical links is one of the track shoes 8. The chains 6—7 are mounted in driving relation on the pulleys 4 and idle over the pulleys 5. The said pulleys 4 have cups $4^a$ to engage the horizontal links and a groove $4^b$ to accommodate the vertical links. The engagement of the horizontal links with the cups cause the rotation of the pulleys 4 to drive the chains and incidentally the track shoes. On each end of each track shoe is formed a projecting flange 9, which flanges 9 overlap at their adjacent ends as at 10 to form a continuous track on which operate the rollers 2 and 3. These rollers have flanges $2^a$ and $3^a$ which hold them in position on the flanges 9.

The flexible chains 6—7 take the place of the roller or sleeve connection now commonly used between the track shoes and as can readily be understood by those skilled in the art, the relative wear on chain links will be less than on the rollers or sleeves. Also, the cost of construction and assembling will be much less, and the same can be more easily replaced when worn. Friction of the parts will be also largely eliminated.

Any form of chain of any common or especially formed type may be used, as is found desirable in practice.

From the foregoing description, it will readily be seen that we have produced such a device as substantially fulfils the objects of the invention as set forth herein.

While this specification sets forth in detail the present and preferred construction of the device, still in practice, such deviations may be resorted to as do not form a departure from the spirit of the invention, as set forth herein.

Having thus described our invention, what we claim as new and novel and desire to secure by Letters Patent is:—

The combination with a driving wheel, idler wheel and supporting rollers therebetween, of a flexible track-chain passing around the wheels and under the rollers, and track shoes fixed rigidly on the alternate links of the chain, the track shoes having projecting flanges on the inner face of each shoe at the sides thereof and bearing against the rollers, the adjacent ends of the flanges on adjacent shoes overlapping to form a continuous track for the rollers.

In testimony whereof we affix our signatures in presence of a witness.

HENRY A. NORDWICK.
WILLIAM A. BARTH.

Witness:
VERADINE WARNER.

Copies of this patent may be obtained for five cents each, by addressing the "Commissioner of Patents, Washington, D. C."